United States Patent
Haaland

(10) Patent No.: US 11,486,297 B2
(45) Date of Patent: Nov. 1, 2022

(54) EXHAUST MANIFOLD

(71) Applicant: DEERE & COMPANY, Moline, IL (US)

(72) Inventor: Eric J. Haaland, Waverly, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/385,648

(22) Filed: Jul. 26, 2021

(65) Prior Publication Data
US 2021/0355864 A1 Nov. 18, 2021

Related U.S. Application Data

(62) Division of application No. 15/941,456, filed on Mar. 30, 2018, now Pat. No. 11,073,076.

(51) Int. Cl.
| | |
|---|---|
| *F02B 37/22* | (2006.01) |
| *F02M 26/16* | (2016.01) |
| *F02B 37/02* | (2006.01) |
| *F01N 13/14* | (2010.01) |
| *F02B 75/20* | (2006.01) |
| *F01N 13/10* | (2010.01) |

(52) U.S. Cl.
CPC ............. *F02B 37/22* (2013.01); *F01N 13/14* (2013.01); *F02B 37/025* (2013.01); *F02M 26/16* (2016.02); *F01N 13/107* (2013.01); *F02B 75/20* (2013.01)

(58) Field of Classification Search
CPC ...... F01N 13/107; F01N 13/14; F02B 37/025; F02B 37/22
See application file for complete search history.

(56) References Cited

U.S. PATENT DOCUMENTS

| | | |
|---|---|---|
| 3,423,926 A | 1/1969 | Nancarrow et al. |
| 3,557,549 A | 1/1971 | Webster |
| (Continued) | | |

FOREIGN PATENT DOCUMENTS

| | | |
|---|---|---|
| CN | 101694178 A | 4/2010 |
| CN | 201437740 U | 4/2010 |
| (Continued) | | |

OTHER PUBLICATIONS

Daimler, "Mercedes-Benz OM471 - the second generation," <https://roadstars.mercedes-benz.com/en_GB/magazine/2015/july/mercedes-benz-om-471-the-latest-generation.html> webpage publically available at least as early as Jul. 2015.

(Continued)

*Primary Examiner* — Ngoc T Nguyen
(74) *Attorney, Agent, or Firm* — Michael Best & Friedrich LLP

(57) ABSTRACT

An exhaust manifold for use with an internal combustion engine including a body, one or more fluid passageways defined by the body, and a valve in fluid communication with at least one of the one or more fluid passageways. The valve of the exhaust manifold being adjustable between an open configuration and a closed configuration. The exhaust manifold also includes an actuator in operable communication with the valve and configured to adjust the valve between the open and closed configurations, and a heat shield at least partially positioned between the actuator and the one or more fluid passageways.

18 Claims, 15 Drawing Sheets

(56) References Cited

U.S. PATENT DOCUMENTS

| | | | |
|---|---|---|---|
| 3,559,397 A * | 2/1971 | Navarro | F02B 37/002 |
| | | | 60/602 |
| 4,008,572 A | 2/1977 | Woollenweber, Jr. | |
| 4,179,892 A | 12/1979 | Heydrich | |
| 4,689,959 A | 9/1987 | Houkita et al. | |
| 4,719,757 A | 1/1988 | Nakazawa et al. | |
| 4,730,456 A * | 3/1988 | Tadokoro | F02B 37/025 |
| | | | 251/298 |
| 4,781,528 A | 11/1988 | Hagita et al. | |
| 4,809,509 A | 3/1989 | Hohkita | |
| 4,886,416 A | 12/1989 | Wunderlich | |
| 4,953,352 A | 9/1990 | Campbell | |
| 5,072,583 A | 12/1991 | Urushihara et al. | |
| 5,092,126 A | 3/1992 | Yano | |
| 5,943,864 A | 8/1999 | Siegfried et al. | |
| 6,073,447 A | 6/2000 | Kawakami et al. | |
| 6,216,459 B1 | 4/2001 | Daudel et al. | |
| 6,217,001 B1 | 4/2001 | Gluchowski et al. | |
| 6,247,461 B1 | 6/2001 | Smith et al. | |
| 6,324,847 B1 | 12/2001 | Pierpont | |
| 6,877,492 B1 | 4/2005 | Osterwald | |
| 7,509,800 B2 | 3/2009 | I et al. | |
| 7,828,517 B2 | 11/2010 | Serres | |
| 8,096,124 B2 | 1/2012 | Pierpont et al. | |
| 8,348,231 B2 | 1/2013 | Czimmek et al. | |
| 8,424,304 B2 | 4/2013 | Serres et al. | |
| 9,822,660 B2 * | 11/2017 | Tashiro | F01D 17/16 |
| 10,385,885 B2 * | 8/2019 | Howell | F02B 37/186 |
| 10,662,904 B2 | 5/2020 | Haaland et al. | |
| 10,947,860 B2 * | 3/2021 | Kurata | F16C 33/74 |
| 2001/0032467 A1 | 10/2001 | Martin | |
| 2002/0062642 A1 | 5/2002 | Dini et al. | |
| 2002/0073978 A1 | 6/2002 | Feucht et al. | |
| 2003/0053910 A1 | 3/2003 | Hosny | |
| 2003/0115875 A1 | 6/2003 | Sumser et al. | |
| 2003/0154717 A1 | 8/2003 | Schmid et al. | |
| 2005/0217266 A1 * | 10/2005 | Noelle | F02B 37/24 |
| | | | 60/602 |
| 2005/0247058 A1 | 11/2005 | Pedersen et al. | |
| 2006/0059908 A1 | 3/2006 | Schorn et al. | |
| 2006/0086089 A1 | 4/2006 | Ge | |
| 2007/0079612 A1 | 4/2007 | Grissom | |
| 2007/0107430 A1 | 5/2007 | Schmid et al. | |
| 2007/0175215 A1 | 8/2007 | Rowells | |
| 2007/0180826 A1 | 8/2007 | Sumser et al. | |
| 2008/0085185 A1 | 4/2008 | Towsley et al. | |
| 2009/0000296 A1 | 1/2009 | Pierpont et al. | |
| 2009/0041577 A1 | 2/2009 | Serres | |
| 2009/0047121 A1 | 2/2009 | Whiting et al. | |
| 2009/0100834 A1 | 4/2009 | Sexton | |
| 2009/0120087 A1 * | 5/2009 | Sumser | F02B 37/22 |
| | | | 60/600 |
| 2009/0193806 A1 | 8/2009 | Kong et al. | |
| 2009/0290980 A1 | 11/2009 | Higashimori | |
| 2010/0024414 A1 | 2/2010 | Hittie et al. | |
| 2010/0024416 A1 | 2/2010 | Gladden et al. | |
| 2010/0024419 A1 | 2/2010 | Pierpont et al. | |
| 2010/0037601 A1 | 2/2010 | Pierpont | |
| 2010/0077747 A1 | 4/2010 | Pierpont et al. | |
| 2010/0229550 A1 | 9/2010 | Kuspert et al. | |
| 2010/0310364 A1 | 12/2010 | Botsch et al. | |
| 2011/0099998 A1 | 5/2011 | Serres et al. | |
| 2011/0236198 A1 | 9/2011 | Fahl | |
| 2011/0289914 A1 | 12/2011 | Afjeh | |
| 2011/0302917 A1 | 12/2011 | Styles et al. | |
| 2012/0023936 A1 | 2/2012 | Kruiswyk et al. | |
| 2012/0060494 A1 | 3/2012 | Sato et al. | |
| 2012/0159946 A1 | 6/2012 | Sauerstein | |
| 2012/0251315 A1 | 10/2012 | Watanabe et al. | |
| 2013/0000300 A1 | 1/2013 | O'Hara | |
| 2013/0014497 A1 | 1/2013 | Wu et al. | |
| 2013/0014502 A1 | 1/2013 | Sato | |
| 2013/0121820 A1 | 5/2013 | Koshida et al. | |
| 2013/0164114 A1 | 6/2013 | Ervin et al. | |
| 2013/0219885 A1 | 8/2013 | Watson et al. | |
| 2013/0309106 A1 | 11/2013 | Yanagida | |
| 2014/0003910 A1 | 1/2014 | Brinkert et al. | |
| 2014/0174075 A1 * | 6/2014 | Garcia Alcaraz | F01D 17/105 |
| | | | 60/602 |
| 2014/0219836 A1 | 8/2014 | Houst et al. | |
| 2014/0298799 A1 | 10/2014 | Wu et al. | |
| 2014/0338328 A1 * | 11/2014 | Lusardi | F01D 9/045 |
| | | | 60/605.2 |
| 2014/0356153 A1 | 12/2014 | Hoshi et al. | |
| 2014/0366532 A1 | 12/2014 | Talwar et al. | |
| 2014/0377059 A1 | 12/2014 | Ulrey et al. | |
| 2015/0023788 A1 | 1/2015 | Shoghi et al. | |
| 2015/0046064 A1 | 2/2015 | Lahti et al. | |
| 2015/0063991 A1 | 3/2015 | Wang et al. | |
| 2015/0064002 A1 | 3/2015 | Chen et al. | |
| 2015/0125265 A1 | 5/2015 | Krewinkel et al. | |
| 2015/0315961 A1 | 11/2015 | Uhlenhake | |
| 2015/0345316 A1 | 12/2015 | Henderson et al. | |
| 2016/0003196 A1 | 1/2016 | Hang et al. | |
| 2016/0025044 A1 | 1/2016 | Martinez-Botas et al. | |
| 2016/0032845 A1 | 2/2016 | Boyer et al. | |
| 2016/0032846 A1 | 2/2016 | Boyer et al. | |
| 2016/0032869 A1 | 2/2016 | Boyer et al. | |
| 2016/0053676 A1 | 2/2016 | Ge et al. | |
| 2016/0090903 A1 | 3/2016 | Almkvist | |
| 2016/0108798 A1 | 4/2016 | Vanderwege | |
| 2019/0301356 A1 | 10/2019 | Haaland | |

FOREIGN PATENT DOCUMENTS

| | | |
|---|---|---|
| CN | 201802444 U | 4/2011 |
| CN | 202500652 U | 10/2012 |
| CN | 103527265 A | 1/2014 |
| CN | 103557069 A | 2/2014 |
| CN | 104594962 A | 5/2015 |
| DE | 3941399 C1 | 1/1991 |
| DE | 4204019 A1 | 5/1993 |
| DE | 19514572 A1 | 10/1996 |
| DE | 102005049552 A1 | 6/2006 |
| DE | 102004062091 A1 | 7/2006 |
| DE | 102007046461 A1 | 4/2009 |
| DE | 202014100235 U1 | 2/2014 |
| EP | 2843236 A1 | 3/2015 |
| GB | 2446597 A | 8/2008 |
| JP | S58-138222 A | 8/1983 |
| JP | S61-46420 A | 3/1986 |
| JP | S61-149523 A | 7/1986 |
| JP | S62-78433 A | 4/1987 |
| JP | S62-251422 A | 11/1987 |
| JP | S63-088221 A | 4/1988 |
| JP | S63-215829 A | 9/1988 |
| JP | S63-302134 A | 12/1988 |
| JP | S63-306233 A | 12/1988 |
| JP | 2010121590 A | 6/2010 |
| JP | 2013113149 A | 6/2013 |
| JP | 2016053352 A | 4/2016 |
| KR | 1998-0017043 U | 7/1998 |
| KR | 10-2011-0129130 A | 12/2011 |
| WO | 2008078020 A1 | 7/2008 |
| WO | 2008157109 A2 | 12/2008 |
| WO | 2012034258 A1 | 3/2012 |
| WO | 2012094781 A1 | 7/2012 |
| WO | 2014102236 A1 | 7/2014 |
| WO | 2015077379 A1 | 5/2015 |
| WO | 2015179386 A1 | 11/2015 |
| WO | 2016035329 A1 | 3/2016 |

OTHER PUBLICATIONS

Cat, "C18 ACERT," <https://www.cat.com/en_US/products/new/power-systems/oil-and-gas/land-mechanical-engines/18495209.html> publicly available at least as early as Oct. 9, 2017 (statement of relevance included).

United States Patent Office Action for U.S. Appl. No. 15/941,715 dated Sep. 17, 2019 (7 pages).

(56) References Cited

OTHER PUBLICATIONS

United States Patent Office Action for U.S. Appl. No. 15/941,456 dated May 13, 2020 (13 pages).

* cited by examiner

EXHAUST MANIFOLD

CROSS-REFERENCE TO RELATED APPLICATIONS

The present application is a divisional application of U.S. patent application Ser. No. 15/941,456, filed Mar. 30, 2018, the entire contents of which is incorporated by reference herein.

FIELD OF THE INVENTION

The present disclosure relates to an exhaust manifold, and more specifically toward an exhaust manifold having a pressure balancing valve.

BACKGROUND

Internal combustion engines utilize turbochargers and exhaust gas recirculation (EGR) systems to improve the performance and environmental impact of a particular engine.

SUMMARY

In one implementation, an exhaust manifold for use with an internal combustion engine having a first cylinder and a second cylinder. The exhaust manifold includes a first fluid path having a first inlet in fluid communication with the first cylinder of the internal combustion engine and a first outlet, a second fluid path having a second inlet in fluid communication with the second cylinder of the internal combustion engine and a second outlet, and a valve adjustable between a first configuration, in which the first fluid pathway is in fluid communication with the second fluid path, and a second configuration, in which the first fluid pathway is not in fluid communication with the second fluid pathway.

In another implementation, an exhaust manifold for use with an internal combustion engine having a first set of one or more cylinders and a second set of one or more cylinders, the exhaust manifold including a body, a first fluid pathway at least partially defined by the body, the first fluid pathway having a first set of one or more inlets and a first outlet, a second fluid pathway at least partially defined by the body, the second fluid pathway having a second set of one or more inlets and a second outlet, where the first fluid pathway shares a common wall with the second fluid pathway, and a valve formed into the common wall, where the valve is adjustable between a first configuration, in which the first fluid pathway is in fluid communication with the second fluid pathway, and a second configuration, in which the first fluid pathway is not in fluid communication with the second fluid pathway.

In another implementation, an engine system including an internal combustion engine having a first set of one or more cylinders and a second set of one or more cylinders, a dual-inlet turbocharger having a first turbocharger inlet and a second turbocharger inlet, and an exhaust manifold including a body, a first fluid pathway at least partially defined by the body, the first fluid pathway having a first set of one or more inlets in fluid communication with the first set of one or more cylinders and a first outlet in fluid communication with the first turbocharger inlet, a second fluid pathway at least partially defined by the body, the second fluid pathway having a second set of one or more inlets in fluid communication with the second set of one or more cylinders and a second outlet in fluid communication with the second turbocharger inlet, a valve adjustable between a first configuration, where the first fluid pathway is in fluid communication with the second fluid pathway, and a second configuration, where the first fluid pathway is not in fluid communication with the second fluid pathway.

In another implementation, an exhaust manifold for use with an internal combustion engine having a first cylinder and a second cylinder, the exhaust manifold including a body, a first fluid pathway at least partially defined by the body, the first fluid pathway having a first inlet, a first outlet, and a first communication aperture positioned between the first inlet and the first outlet a second fluid pathway at least partially defined by the body, the second fluid pathway having a second inlet, a second outlet, and a second communication aperture positioned between the second inlet and the second outlet, a secondary chamber at least partially defined by the body, the secondary chamber being open to the first communication aperture and the second communication aperture a valve at least partially positioned within the secondary chamber, where the valve is adjustable between a first configuration, in which the first fluid pathway is in fluid communication with the second fluid pathway, and a second configuration, in which the first fluid pathway is not in fluid communication with the second fluid pathway.

In another implementation, an exhaust manifold for use with an internal combustion engine including a body, one or more fluid passageways defined by the body, and a valve in fluid communication with at least one of the one or more fluid passageways. The valve of the exhaust manifold being adjustable between an open configuration and a closed configuration. The exhaust manifold also includes an actuator in operable communication with the valve and configured to adjust the valve between the open and closed configurations, and a heat shield at least partially positioned between the actuator and the one or more fluid passageways.

In another implementation, an exhaust manifold for use with an internal combustion engine, the exhaust manifold including a body, one or more fluid passageways defined by the body, a valve in fluid communication with at least one of the one or more fluid passageways, the valve being adjustable between an open configuration and a closed configuration, an actuator mounted to a bracket and in operable communication with the valve and configured to adjust the valve between the open and closed configurations, and a heat shield at least partially positioned between the actuator and the body, where the heat shield is mounted to the bracket, and where the heat shield is configured such that the heat shield can be detached from the bracket without having to first detach the actuator from the bracket.

In another implementation, an exhaust manifold for use with an internal combustion engine having a fluid cooling system, the exhaust manifold including a body, one or more fluid passageways defined by the body, a valve in fluid communication with at least one of the one or more fluid passageways, the valve being adjustable between an open configuration and a closed configuration, an actuator in operable communication with the valve and configured to adjust the valve between the open and closed configurations, and a heat shield at least partially positioned between the actuator and the body, where the heat shield defines a fluid jacket.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

This disclosure generally relates to an exhaust manifold for use with a turbocharged internal combustion engine device, and more particularly to a dual-plane exhaust manifold having a pressure-balancing valve configured to provide selective fluid communication between the two planes of the manifold.

Figure 1:
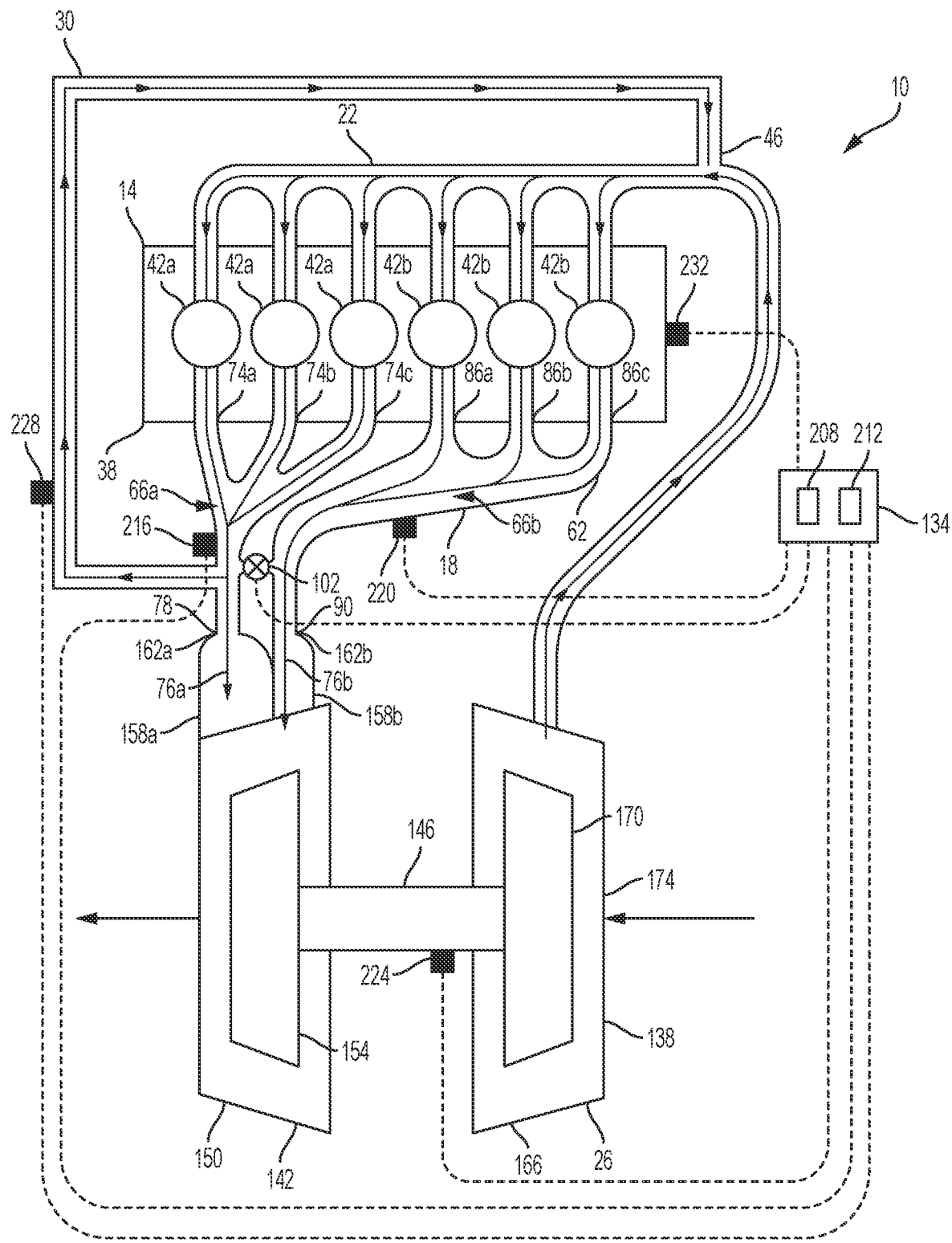
FIG. 1 is a schematic view of a device having an engine, a turbocharger, and a controller.

Referring to FIG. 1, a turbocharged device 10 includes an internal combustion engine 14, an exhaust manifold 18 coupled to the engine 14, an intake manifold 22 coupled to the engine 14, a turbocharger 26 coupled to and in operable communication with the intake manifold 22 and the exhaust manifold 18, and an exhaust gas recirculation (EGR) circuit 30. During operation, the internal combustion engine 14 produces exhaust gasses which are directed into the turbocharger 26 by the exhaust manifold 18. The turbocharger 26, in turn, uses the energy provided by the exhaust gasses to compress and direct fresh air into the engine 14 via the intake manifold 22. Furthermore, a portion of the exhaust gasses may be drawn from the exhaust manifold 18 and recirculated through the engine 14 via the EGR circuit 30 (described below).

The engine 14 of the turbocharged device 10 includes an engine block 38 at least partially defining a plurality of cylinders 42a, 42b as is well known in the art. More specifically, the engine 14 includes a first set of one or more cylinders 42a, and a second set of one or more cylinders 42b. In the illustrated implementation, the engine 14 is an inline-6 engine having a first set of three cylinders 42a, and a second set of three cylinders 42b (see FIG. 1). However, in alternative implementations various engine styles and layouts may be used (e.g., I-4, V-8, V-6, Flat-6, and the like). Still further, while the illustrated engine 14 includes two equally sized sets of cylinders (e.g., three cylinders in each sub-group), in alternative implementations each set of cylinders may include any number of one or more cylinders (e.g., two cylinders in a first group and four cylinders in a second group, etc.). In still other implementations, more than two sets of cylinders may be present.

The intake manifold 22 of the device 10 is a standard manifold as is well known in the art. More specifically, the intake manifold 22 includes an inlet 46 configured to receive an air/fuel mixture, and a series of runners (not shown) extending from the inlet 46 to direct the air/fuel mixture into each of the plurality of cylinders 42a, 42b.

The exhaust manifold 18 of the device 10 includes a body 62 defining a plurality of fluid passageways 66a, 66b, each configured to collect exhaust gasses from a subset of cylinders 42a, 42b of the engine 14 and direct the exhaust gasses into a respective one of the one or more inlets 66 of the turbocharger 26 (described below). More specifically, the body 62 of the exhaust manifold 18 defines a first fluid passageway 66a and a second fluid passageway 66b. In the illustrated implementation, the body 62 of the exhaust manifold 18 includes multiple (e.g., two or three) cast portions removeably coupled to one another to form a single unit (not shown). However, in alternative implementations, the body 62 of the exhaust manifold 18 may be cast from a single piece. In still other implementations, the body 62 of the exhaust manifold 18 may include a series of tubes joined together to form the necessary fluid passageways. In still other implementations, the body 62 of the exhaust manifold 18 may be formed from sheet material and the like. The first fluid passageway 66a of the exhaust manifold 18 includes a first set of one or more inlets 74a, 74b, 74c, each corresponding to and configured to receive exhaust gasses from a corresponding one of the first set of cylinders 42a of the engine 14 to produce a first exhaust gas flow 76a. The first fluid passageway 66a also includes a first outlet 78 in constant fluid communication with each of the one or more first inlets 74a, 74b, 74c and is configured to direct the first exhaust gas flow 76a contained within the first fluid passageway 66a into a corresponding one of the inlets of the turbocharger 26 (described below).

The second fluid passageway 66b of the exhaust manifold 18 includes a second set of one or more inlets 86a, 86b, 86c, each corresponding to and configured to receive exhaust gasses from a corresponding one of the second set of cylinders 42b of the engine 14 to produce a second exhaust gas flow 76b. The second fluid passageway 66b also includes a second outlet 90 in constant fluid communication with each of the one or more second inlets 86a, 86b, 86c and configured to direct the second exhaust gas flow 76b contained within the second fluid passageway 66b into a corresponding one of the inlets of the turbocharger 26 (described below).

Figure 2:
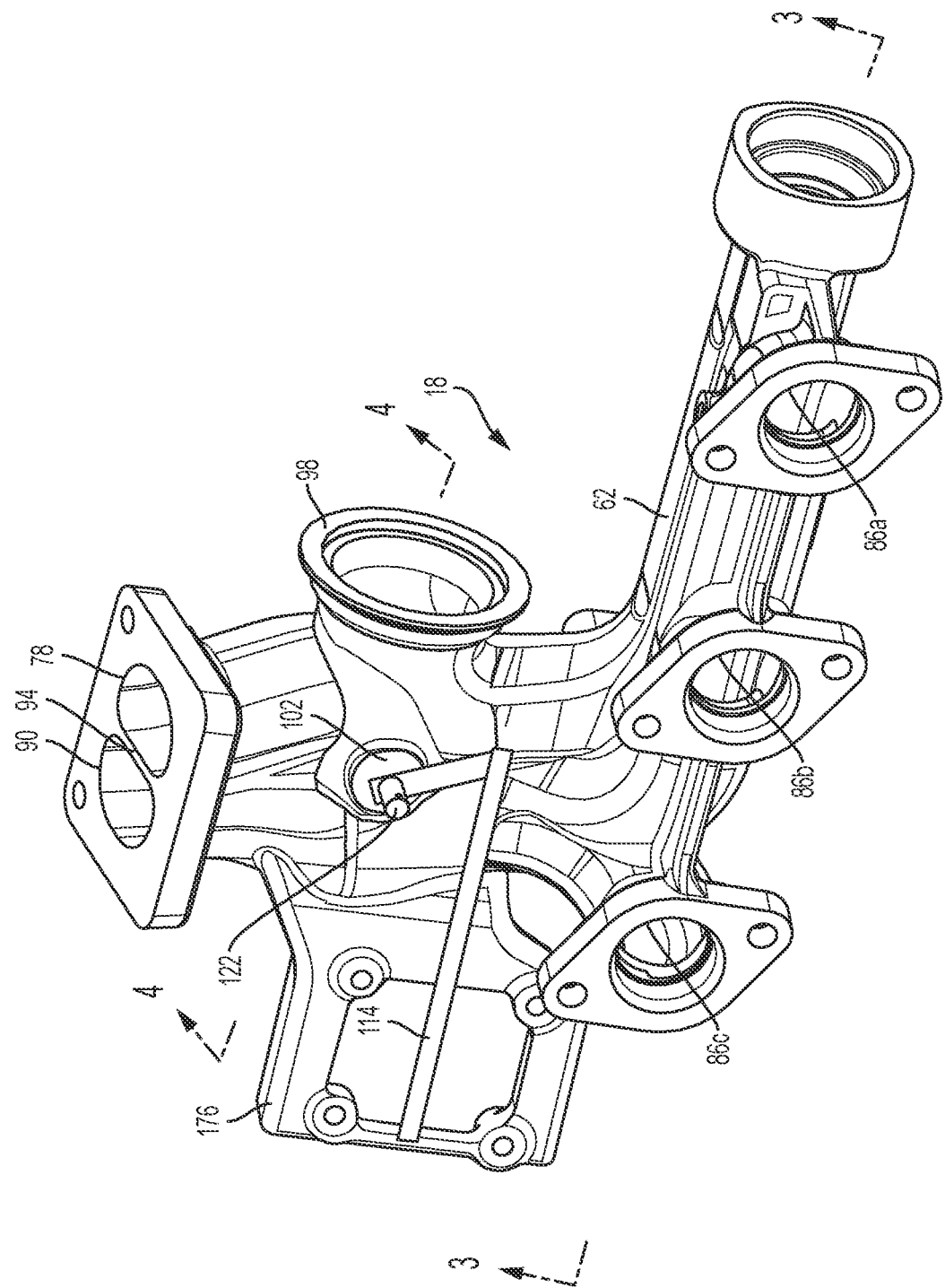
FIG. 2 is a perspective view of an exhaust manifold.
Figure 3:
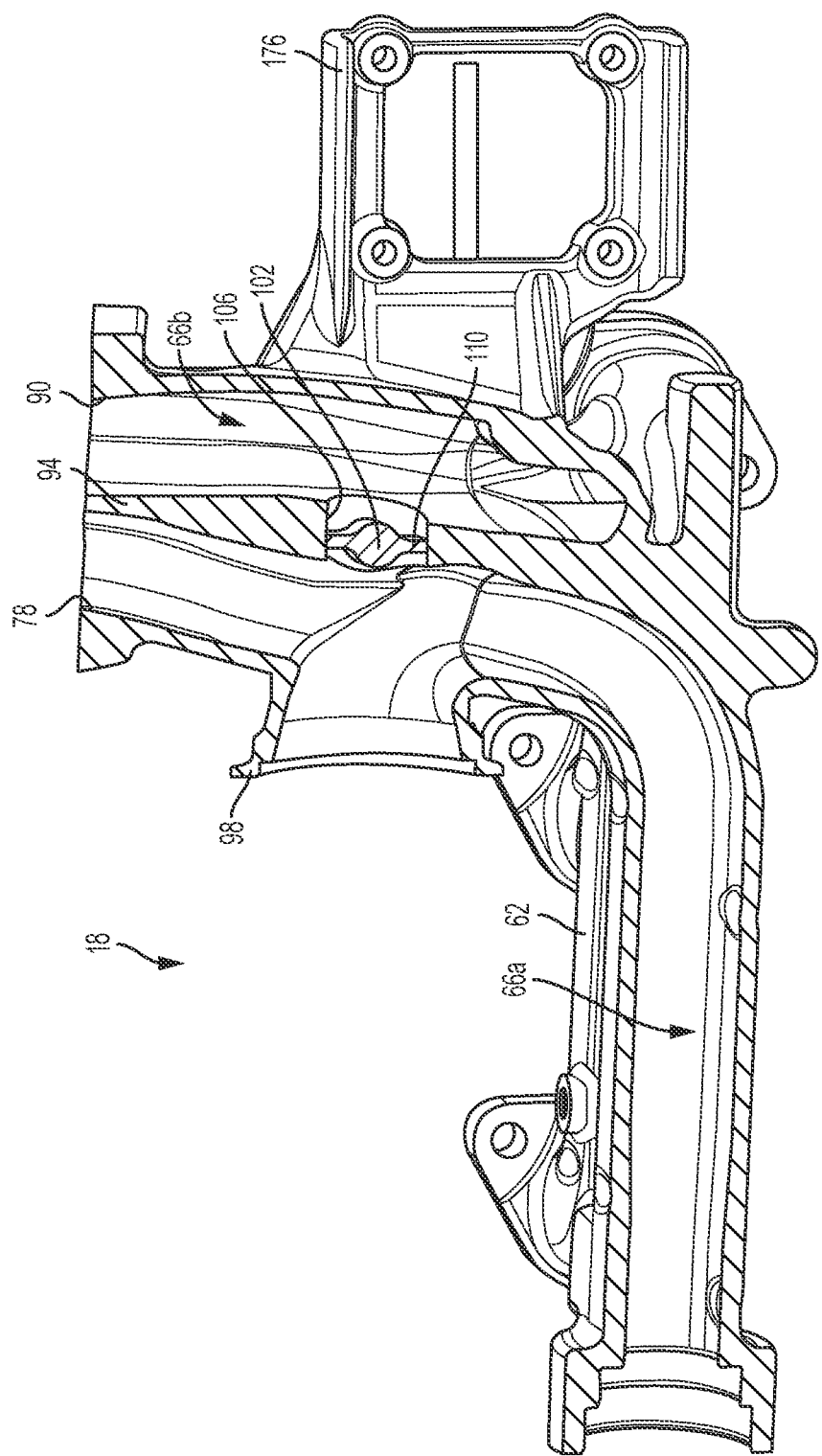
FIG. 3 is a section view taken along line 3-3 of FIG. 2.
Figure 4:
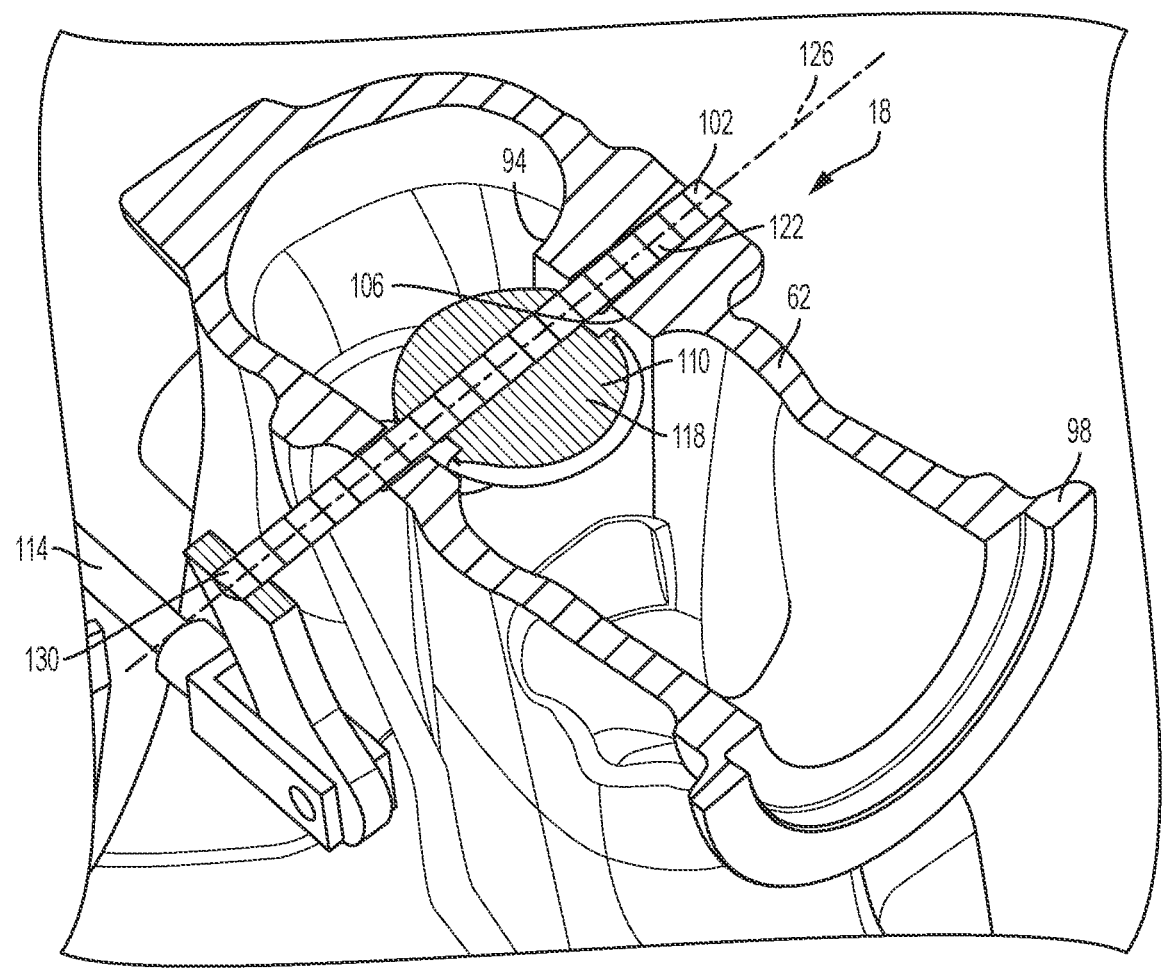
FIG. 4 is a section view taken along line 4-4 of FIG. 2.

In the illustrated implementation, the passageways 66a, 66b of the exhaust manifold 18 are arranged such that they have at least one shared or common wall 94 (see FIGS. 2-4). For the purposes of this application, a shared wall 94 includes any wall where opposing surfaces of a single wall at least partially define both the first and second passageways 66a, 66b. In implementations where the passageways 66a, 66b are defined by individual tubes (not shown), a shared wall may include instances where two tubes are positioned near one another and act to separate gas flow between adjacent passageways.

In the illustrated implementation, the exhaust manifold 18 also includes an EGR port 98 in fluid communication with one of the first passageway 66a. During use, a portion of the first exhaust gas flow 76a within the first passageway 66a is drawn out of the passageway 66a and re-directed through the EGR circuit 30 where it can be recirculated through the engine 14 as is well known in the art.

Figure 10:
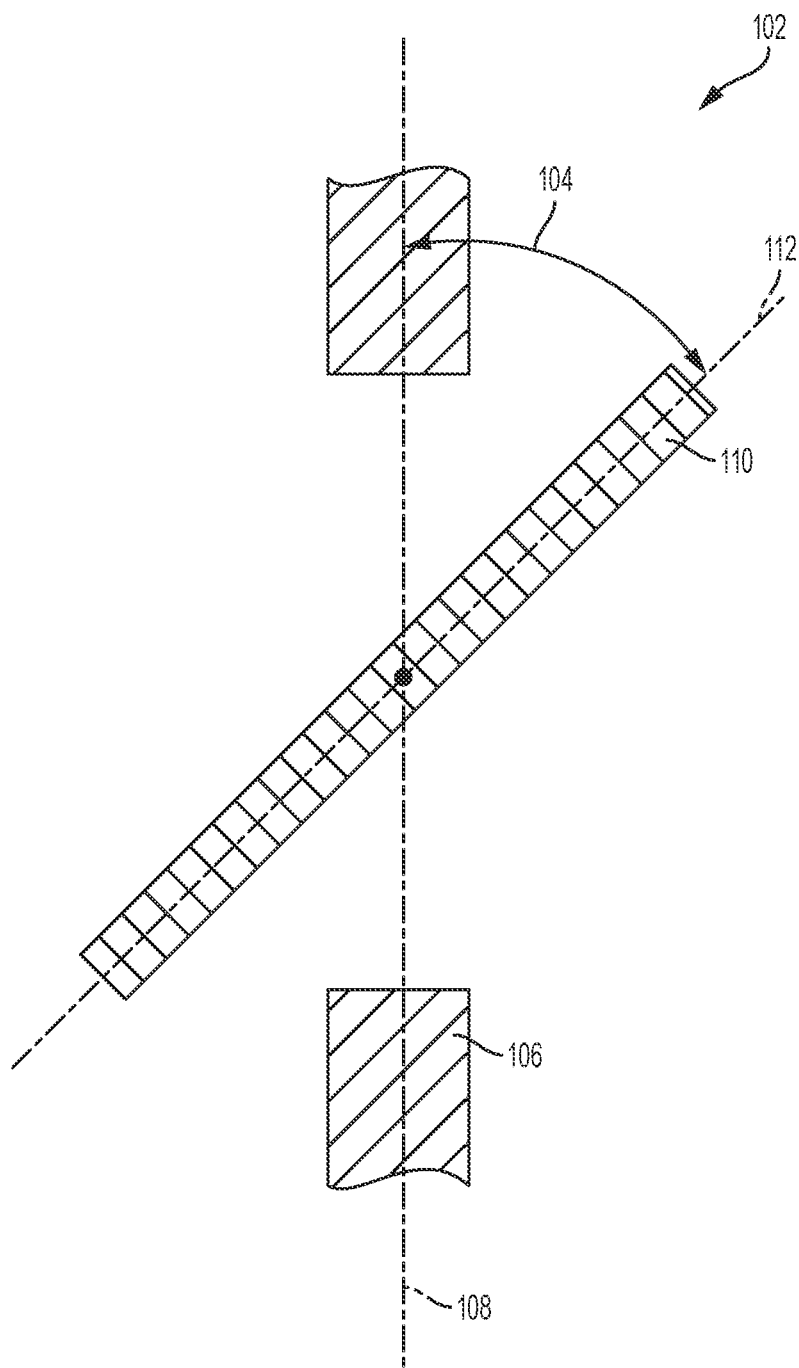
FIG. 10 is a schematic view of a butterfly valve.

The exhaust manifold 18 also includes a valve 102 in fluid communication with both the first fluid passageway 66a and the second fluid passageway 66b and configured to selectively restrict the flow of exhaust gasses therebetween. The valve 102 also defines a valve angle 104 defined as the angle formed between a first plane 108 generally defined by the valve seat 106 and a second plane 112 generally defined by the sealing surface of the valve body 110 (see FIG. 10). During use, the valve 102 is continuously adjustable between a first, fully open configuration, in which the first fluid passageway 66a is in fluid communication with the second fluid passageway 66b and the valve 102 produces a valve angle 104 of approximately 90 degrees; and a second, closed configuration, in which the first fluid passageway 66a is not in fluid communication with the second fluid passageway 66b and the valve 102 produces a valve angle 104 of approximately 0 degrees. Therefore, adjusting the valve 102 from the second configuration to the first configuration (e.g., increasing the valve angle 104) allows the exhaust gasses to flow between the first and second passageways 66a, 66b at an increasingly larger volumetric flow rate, while adjusting the valve 102 from the first configuration to the second configuration (e.g., decreasing the valve angle 104) allows the exhaust gasses to flow between the first and second passageways 66a, 66b at an increasingly lower volumetric flow rate. As such, the pressure differential or ΔP between the two passageways 66a, 66b generally reduces the closer to the first configuration the valve 102 is positioned. While the illustrated valve 102 is shown in the closed configuration with a valve angle 104 of approximately 0 degrees, it is understood that in alternative implementations the closed position may correspond to any valve angle 104 where the first fluid passageway 66a is not in fluid communication with the second fluid passageway 66b, such as valve angles 104 between about 10 and 30 degrees.

In the illustrated implementation, the valve 102 includes a butterfly valve positioned between and in fluid communication with both passageways 66a, 66b. More specifically, the valve 102 includes a valve seat 106 formed into the body 62 of the exhaust manifold 18, a valve body 110 movable with respect to the valve seat 106, and an actuation device 114 (not shown) configured to move the valve body 110 with respect to the valve seat 106.

The valve seat 106 of the valve 102 includes an aperture defined by the shared wall 94 and in fluid communication with both passageways 66a, 66b. The valve seat 106 is substantially circular in shape, having a size and shape that generally corresponds to the outer contour of the valve body 110. Although not shown, the valve seat 106 may also include a ridge, seal, or other geometric features formed therein to allow the valve seat 106 to selectively engage the valve body 110 when the valve 102 is in a closed configuration (described below).

The valve body 110 of the valve 102 includes a disk 118 and a support rod 122 coupled to the disk 118 to define an axis of rotation 126 therethrough. When assembled, the support rod 122 is rotationally mounted within the body 62 of the exhaust manifold 18 such that at least one distal end 130 is accessible outside the body 62. During use, the valve body 110 is mounted for rotation with respect to the valve seat 106 about the axis of rotation 126 between a fully open position, in which the disk 118 is positioned generally perpendicular to the valve seat 106, and a fully closed position, in which the disk 118 is positioned generally parallel to and engages the valve seat 106. Generally speaking, the fully open position of the valve body 110 corresponds to the fully open configuration of the valve 102, while the closed position of the valve body 110 corresponds to the closed configuration of the valve 102.

Illustrated in FIGS. 2-4, the valve 102 also includes an actuation device 114 in operable communication with the valve body 110 and configured to adjust the valve body 110 between the fully open and closed positions. In the illustrated implementation, the actuation device 114 includes an electronic actuator configured to receive a series of electronic signals from a controller 134 (described below) which, in turn, causes the actuation device 114 to apply a torque to the distal end 130 of the support rod 122 and rotate the valve body 110 about the axis of rotation 126 (e.g., change the valve angle 104). As such, the actuation device 114 is able to specifically position the valve body 110 during operation of the engine 14.

In alternative implementations, the actuation device 114 may include an electro-mechanical or mechanical device configured to adjust the valve angle 104 of the valve 102 based at least in part on one or more mechanical inputs such as gas pressure, gas or liquid temperature, and the like.

Figure 5:
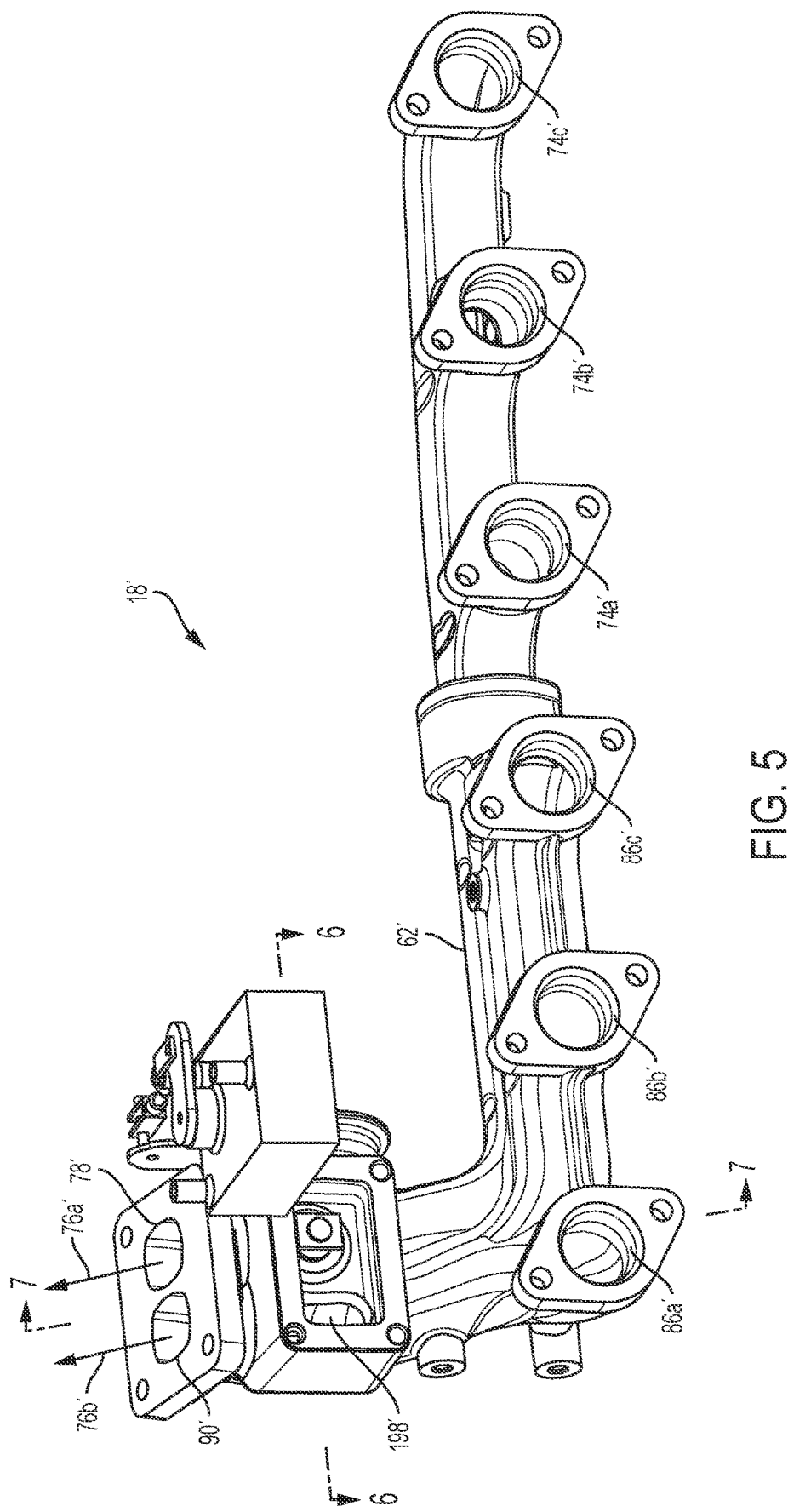
FIG. 5 is a perspective view of another implementation of an exhaust manifold.
Figure 6:
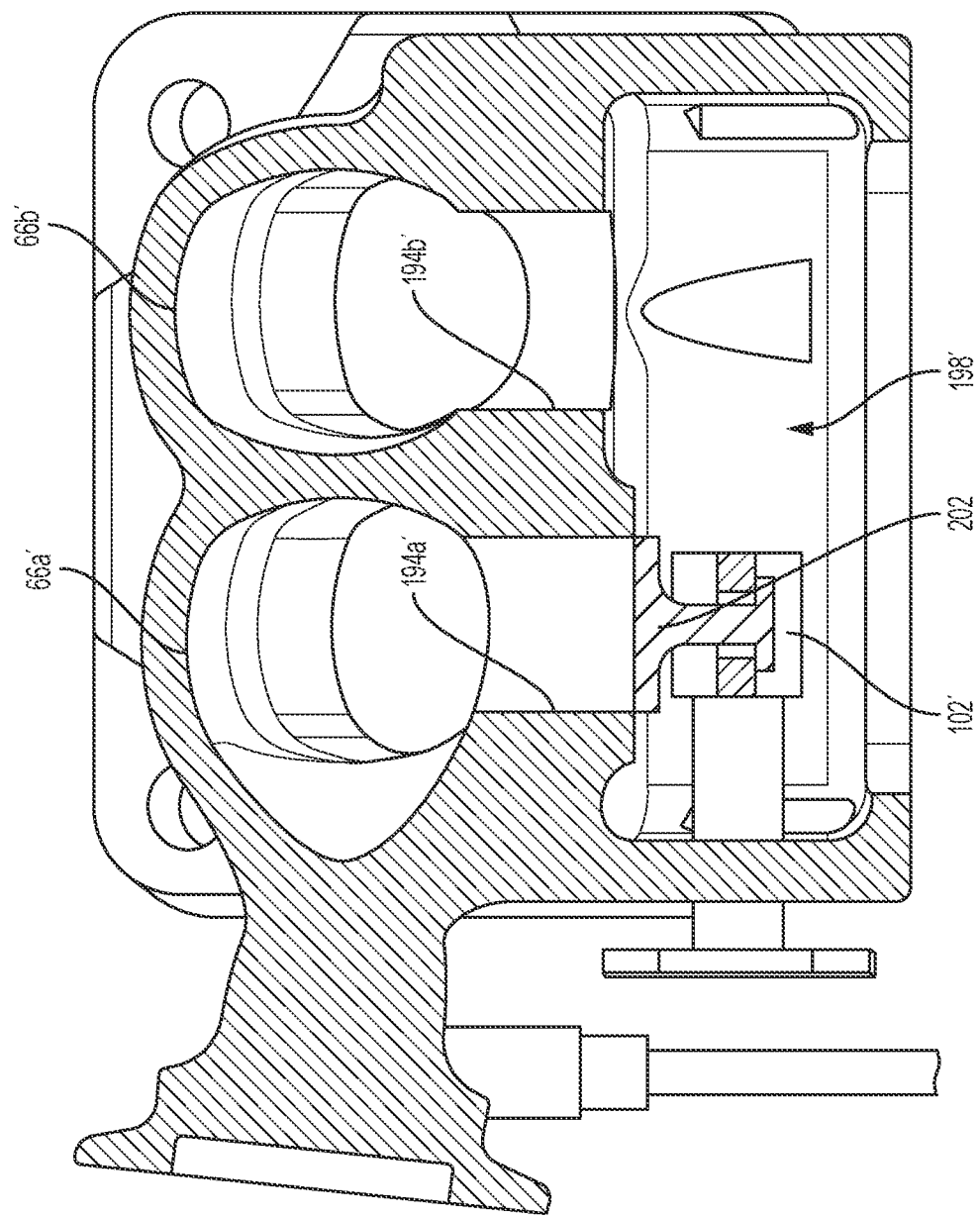
FIG. 6 is a section view taken long line 6-6 of FIG. 5.
Figure 7:
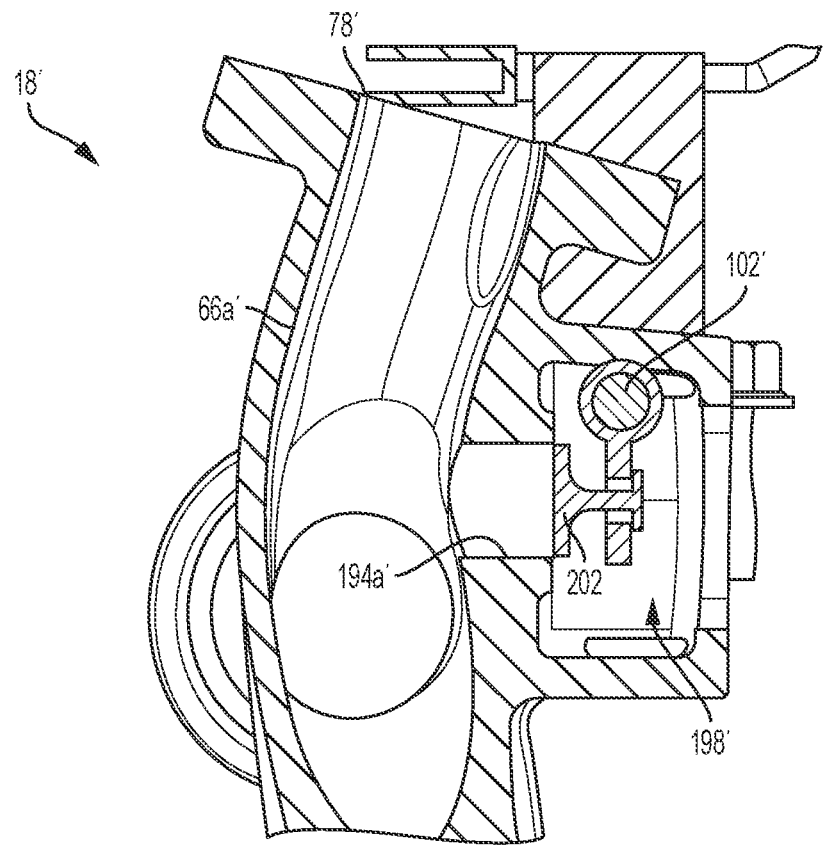
FIG. 7 is a section view taken long line 7-7 of FIG. 5.

While the illustrated implementation illustrates the use of a butterfly valve (FIGS. 2-4) and a gate valve (FIGS. 5-7). It is to be understood that alternative types of valves may also be used including, but not limited to, a ball valve, a poppet valve, a rotary valve, a globe valve, a piston valve, and the like.

Illustrated in FIGS. 2-3 and 8-9, the exhaust manifold 18 also includes a bracket 176 mounted to and supported by the body 62 of the exhaust manifold 18 and configured to support at least one of a heat shield 180 and the actuation device 114 thereon. The bracket 176 includes a first set of mounting points 184 that are fixed in position relative to the body 62 of the exhaust manifold 18, and a second set of mounting points 188 also fixed in position relative to the body 62 of the exhaust manifold 18. In the illustrated implementation, the bracket 176 is formed integrally together with the body 62 as a single cast piece. However, in alternative implementations, the bracket 176 may be formed separately from the body 62 but coupled (e.g., bolted or welded) directly thereto.

In the illustrated implementation, the size, shape, and contour of the bracket 176 is configured to minimize any relative movement between the body 62 and the mounting points 184, 188 of the bracket 176 due to manifold machining tolerances, assembly tolerances, vibration, thermal expansion and contraction. More specifically, the bracket 176 is configured to minimize any relative misalignment and movement between the mounting points 184, 188 and the axis 126 of the valve 102 allowing the actuation device 114 (described below) to more accurately control the valve angle 104. In the illustrated implementation bracket 176 is configured to maintain the first set of mounting points within ±0.5 mm of the valve centerline axis.

Figure 8:
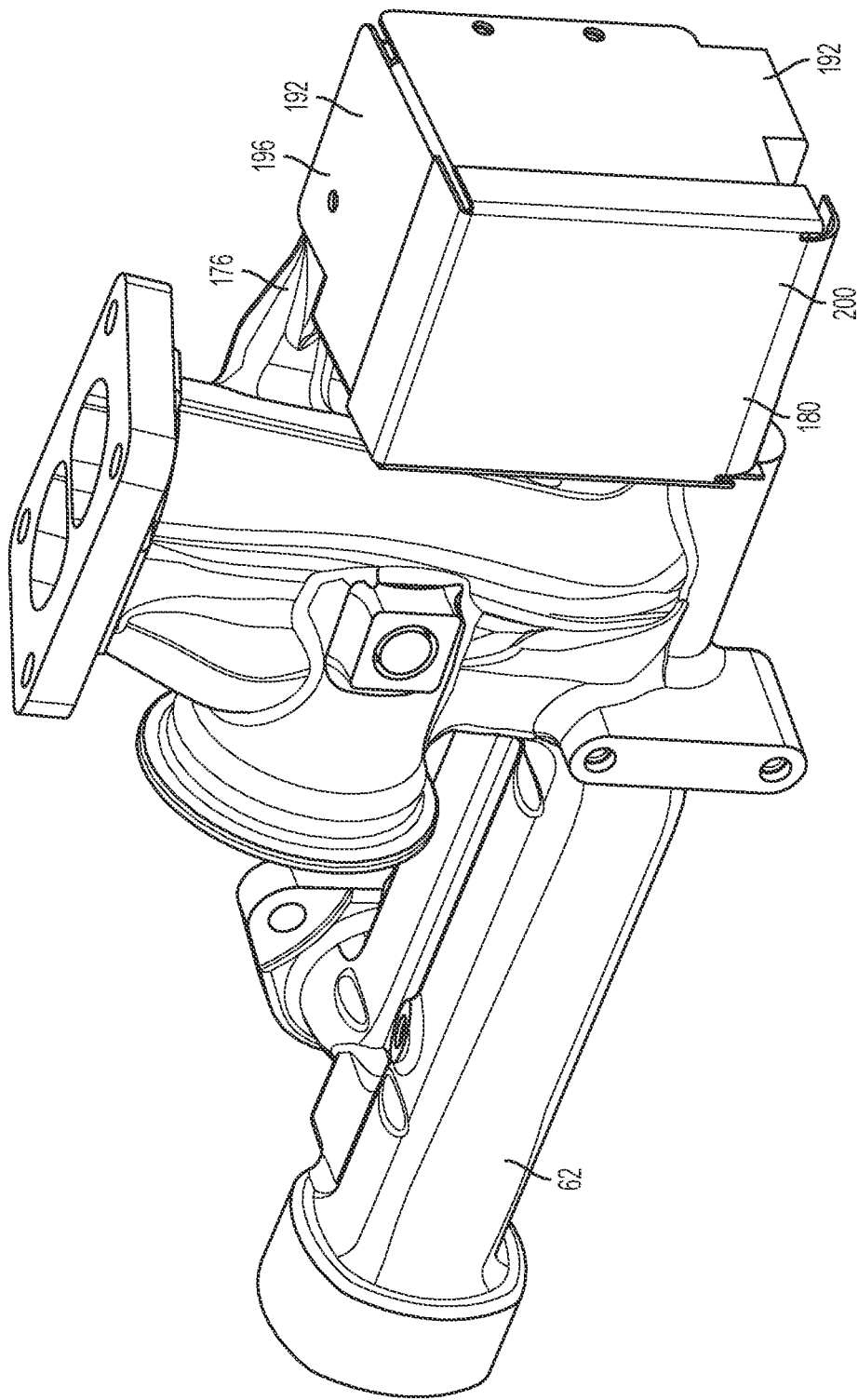
FIG. 8 is a perspective view of the exhaust manifold of FIG. 2, with a heat shield coupled thereto.
Figure 9:
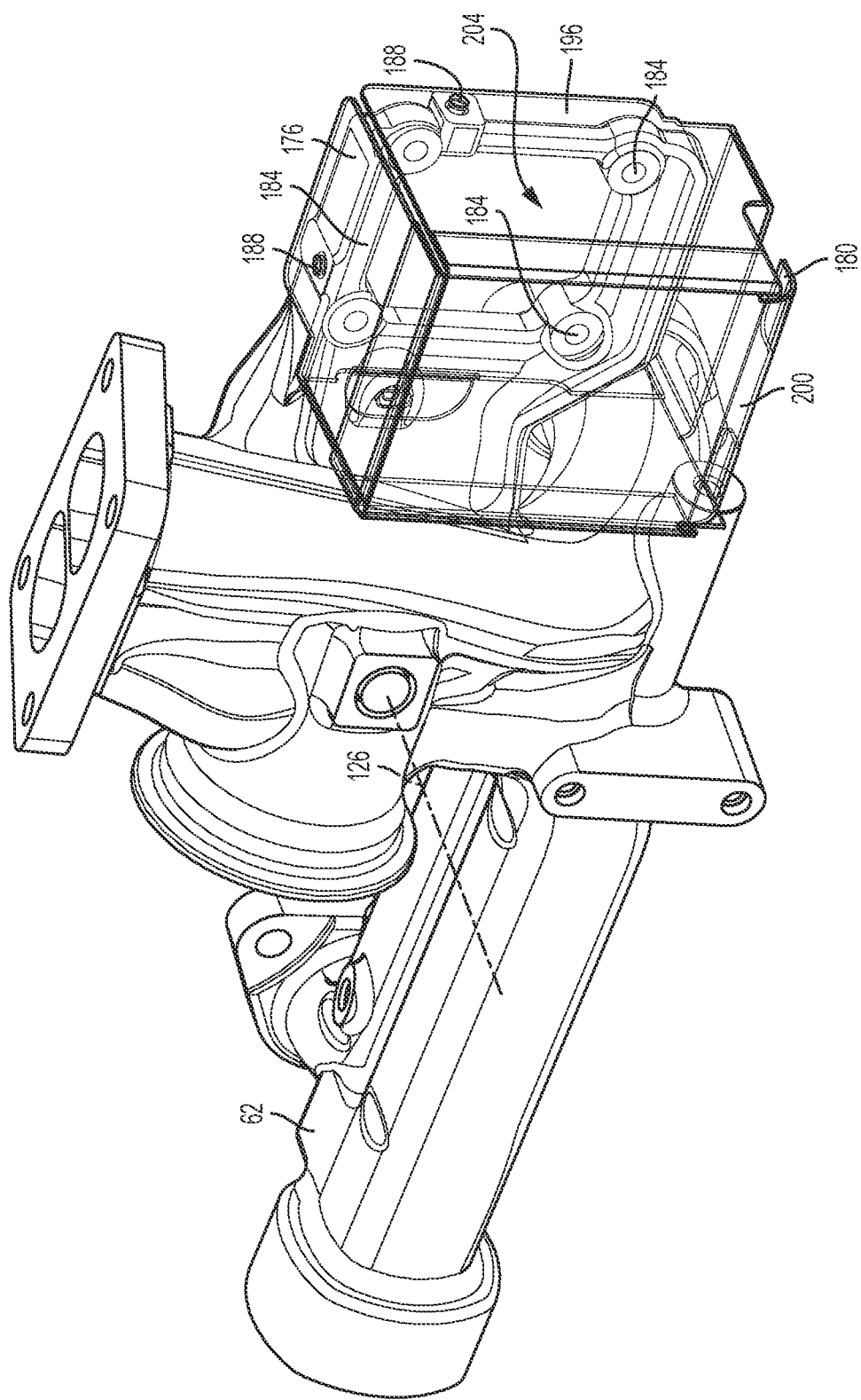
FIG. 9 is a perspective view of the exhaust manifold of FIG. 8, with the heat shield translucent.

Illustrated in FIGS. 8 and 9, the exhaust manifold 18 also includes a thermal isolator 190 configured to at least partially insulate the actuation device 114 from the thermal energy produced by the body 62 of the exhaust manifold 18. In the illustrated implementation, the thermal isolator 190 includes a heat shield 180 coupled to the bracket 176 and configured to at least partially encompass the actuation device 114 therein. More specifically, the heat shield 180 includes one or more walls 192 configured to deflect, block, and/or absorb at least a portion of the radiant thermal energy output from the body 62 of the exhaust manifold 18 during use. By doing so, the heat shield 180 reduces the amount of thermal energy that interacts with the actuation device 114, thereby reducing the operating temperature of the actuation device 114 and allowing the actuation device 114 to be positioned closer to the exhaust manifold 18 during use.

As shown in FIGS. 8 and 9, the heat shield 180 includes a first portion 196 coupled to the second set of mounting points 188 of the bracket 176, and a second portion or cap 200 coupled to the first portion 196. Together, the first portion 196 and the second portion 200 at least partially define a storage volume 204 sized and shaped to receive at least a portion of the actuation device 114 therein. Still further, the heat shield 180 is configured to allow one or both of the portions 196, 200 to be detached from the bracket 176 without having to first detach the actuation device 114 therefrom. As such, the user can gain access to the actuation device 114 without having to alter its alignment relative to the valve 102 and the like.

Furthermore, the walls 192 of the heat shield 180 are generally formed from metallic, ceramic, or other materials capable of shielding the actuation device 114 from the radiant thermal energy output from the body 62 of the exhaust manifold 18 during use. However, in alternative implementations, one or more of the walls 192 may include insulation or reflective coatings applied thereto to improve the shielding capabilities of the walls 192.

Figure 13:
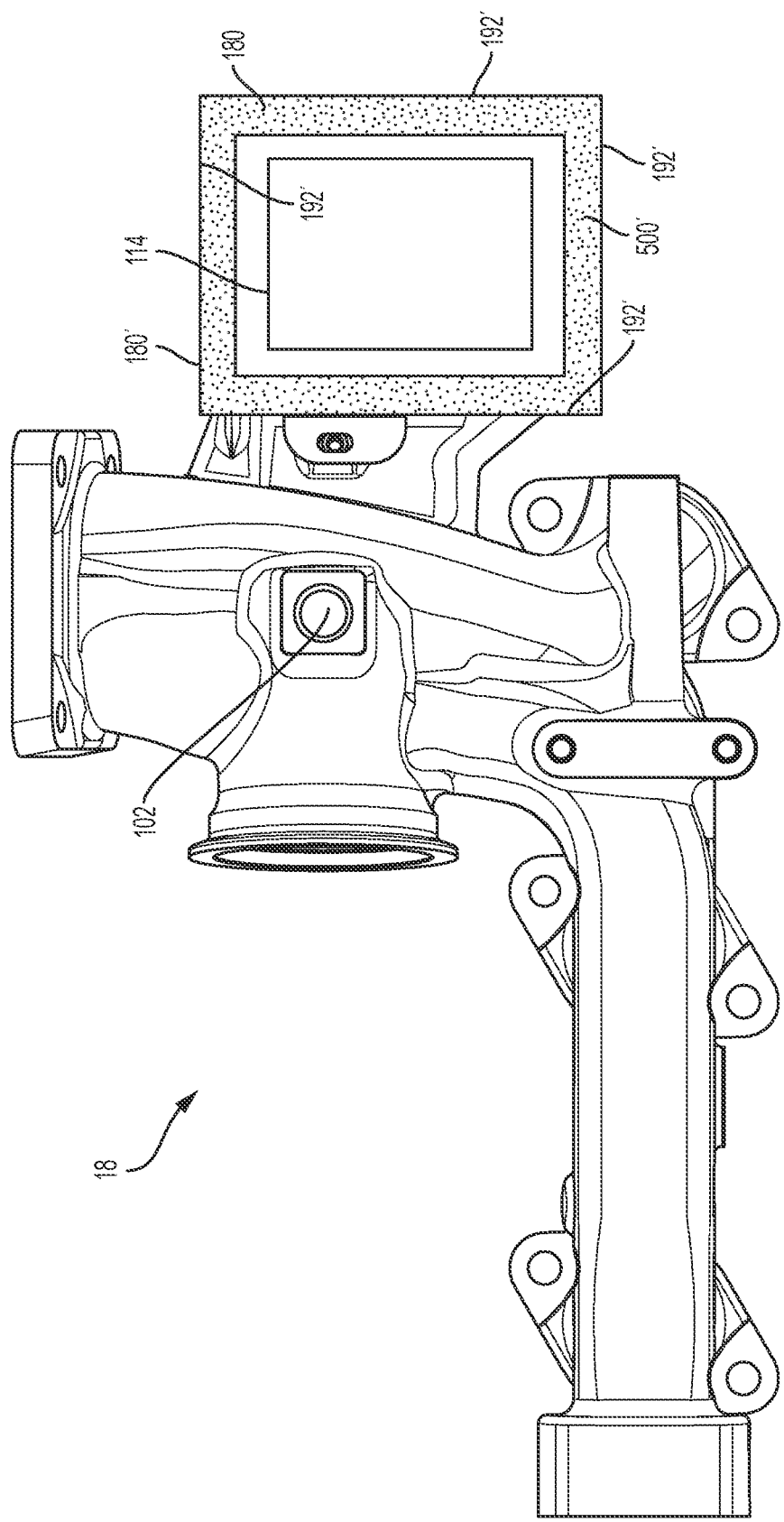
FIG. 13 is a front view of the exhaust manifold of FIG. 11 with an alternative implementation of a heat shield installed thereon.
Figure 14:
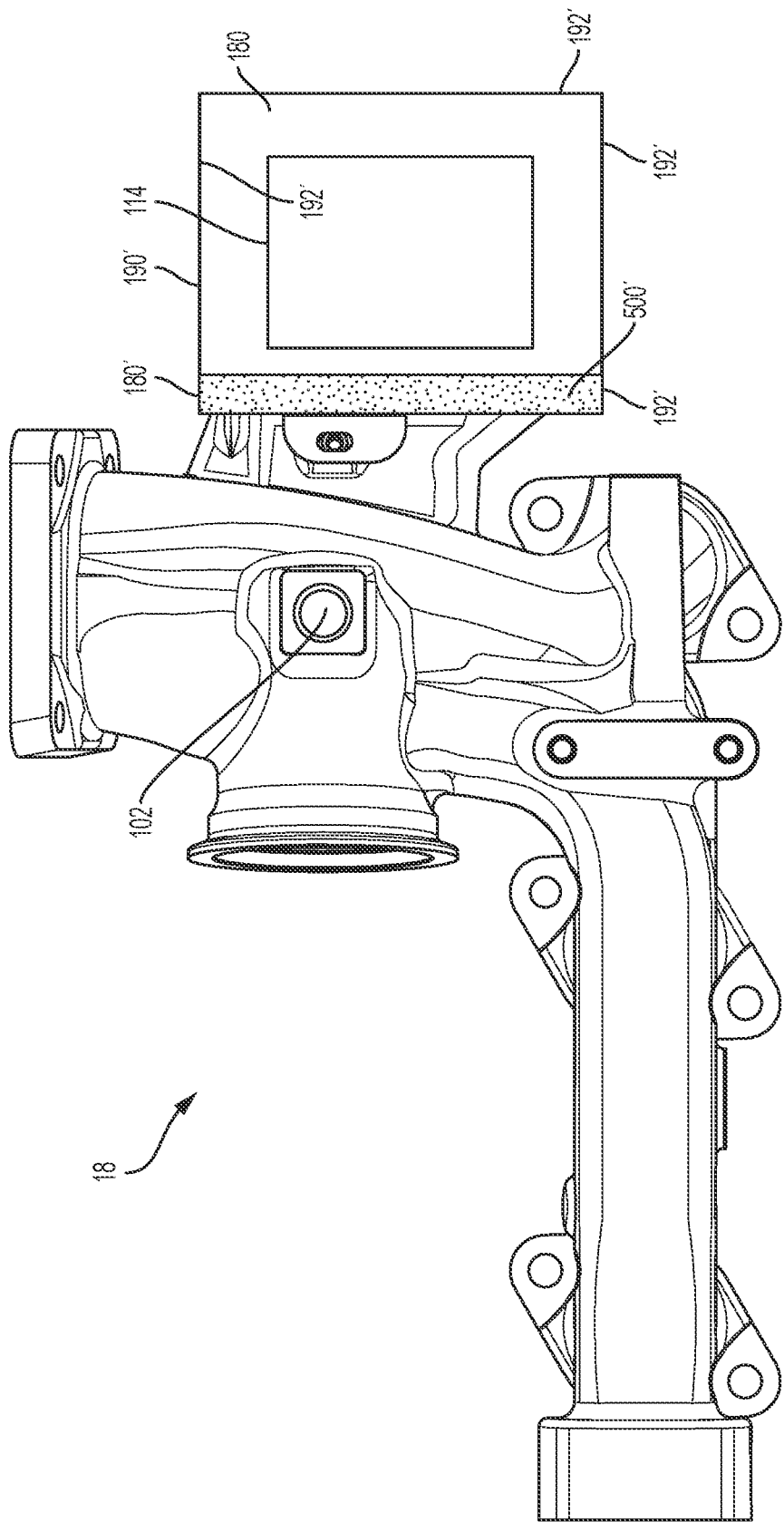
FIG. 14 is a front view of the exhaust manifold of FIG. 11 with an alternative implementation of a heat shield installed thereon.

Another implementation of the thermal isolation device 190' is illustrated in FIG. 13. In the alternative implementation, the thermal isolation device 190' includes a heat shield 180' having a plurality of walls 192' where each wall 192' defines a fluid jacket 500' therein. During use, water or other fluids are circulated through the jacket 500' to reduce the temperature of the walls 192' and increase the shielding capabilities of the heat shield 180'. In some implementations, the fluid jacket 500' of the heat shield 180' may be in fluid communication with the cooling system of the corresponding engine 18, while in other implementations, the jacket 500' may be in fluid communication with a stand-alone cooling system (not shown). While the illustrated implementation shows each of the walls 192' of the heat shield 180' including a fluid jacket 500' formed therein, in alternative implementations, only a subset of the walls 192' may include a fluid jacket 500'. For example, in some implementations, only the walls or portions of walls positioned between the body 62 of the exhaust manifold 18 and the actuation device 114 may define a fluid jacket 500' therein (see FIG. 14).

Figure 15:
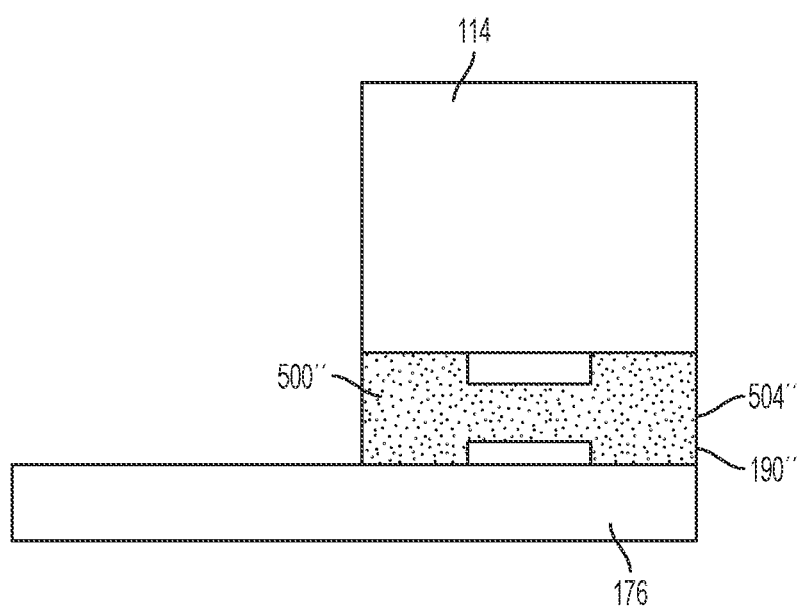
FIG. 15 is a schematic view of another implementation of a thermal isolator.

FIG. 15 illustrates another implementation of the thermal isolation device 190". The thermal isolation device 190" includes a spacer 504" positioned between the actuation device 114 and the bracket 176. The spacer 504" is configured to thermally isolate the actuation device 114 from the bracket 176 and minimize the amount of heat conducted therebetween. In the illustrated implementation, the spacer 504" defines a fluid jacket 500" through which water or other fluids may be circulated to cool the spacer 504" and better thermally isolate the actuation device 114. As described above, the fluid jacket 500", in turn, may be in fluid communication with the cooling system of the engine 18 or a separate cooling circuit (not shown). In still other implementations, the spacer 504" may be solid (e.g., have no fluid jacket 500") or include openings formed therein to promote the flow of air therethrough. In such implementations, the spacers 504" may be formed of ceramic.

While the spacer 504" is shown being positioned between the bracket 176 and the actuation device 114, it is be understood that in implementations where the bracket 176 is formed separately from the rest of the body 62 of the exhaust manifold that a spacer 504" may be positioned therebetween. Furthermore, while the spacer 504" is shown as being a single unit, in alternative implementations, the spacer 504" may include multiple individual elements, each positioned between the actuation device 114 and the bracket 176. In such implementations, a single spacer 504" may correspond with each mounting point defined by the bracket 176.

While the illustrated thermal isolation devices 190, 190', 190" are shown having one of a spacer 504" or a heat shield 180, 180', it is to be understood that a combination of devices may be used to minimize the transfer of both radiant and conductive thermal energy to the actuation device 114.

Figure 11:
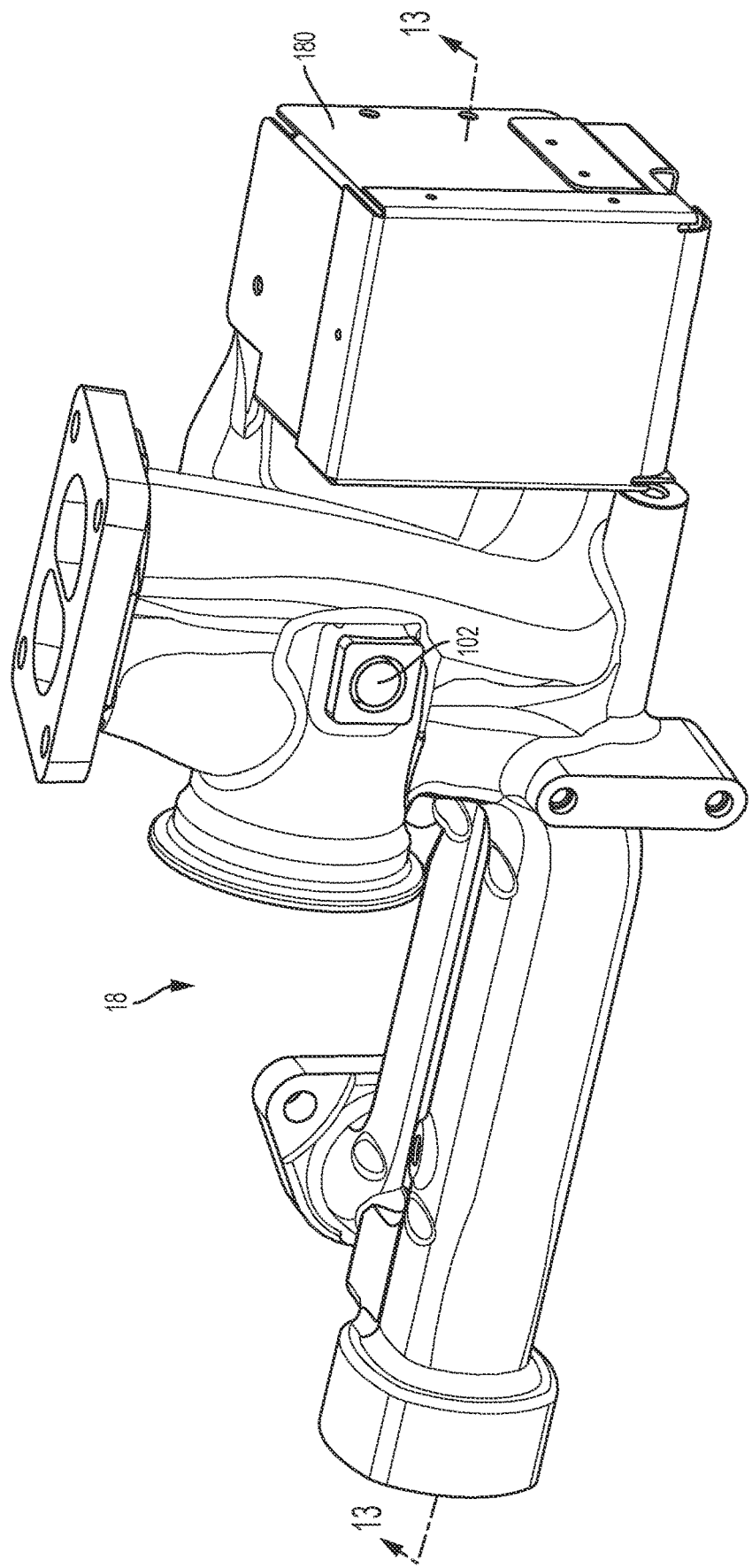
FIG. 11 is a perspective view of another implementation of the exhaust manifold.
Figure 12:
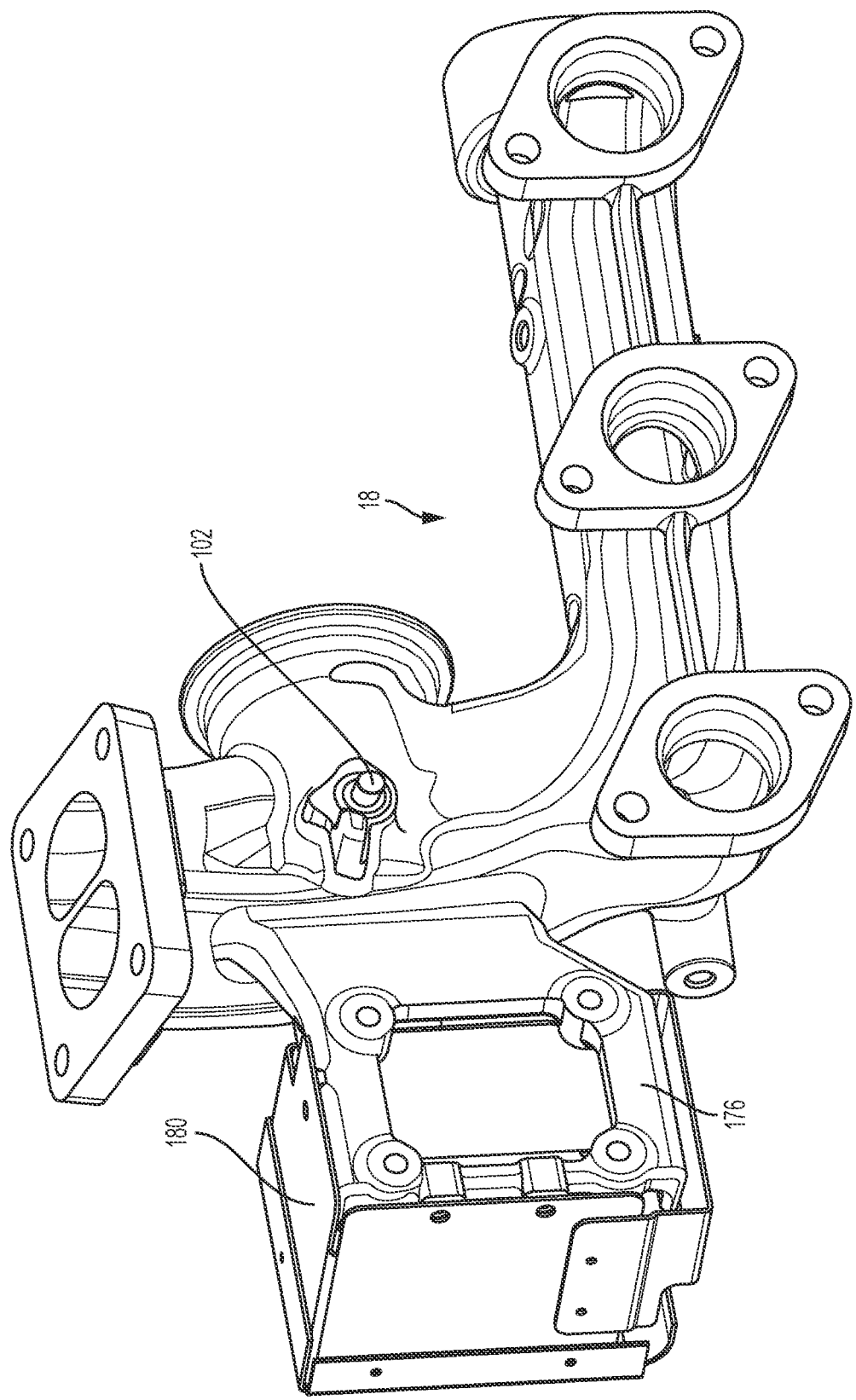
FIG. 12 is a rear perspective view of the exhaust manifold of FIG. 11.

FIGS. 11-12 illustrated another implementation of the exhaust manifold that is substantially similar to the exhaust manifold as shown in FIGS. 2-4. As such, the details of this implementation are not included herein.

Illustrated in FIG. 1, the dual-inlet turbocharger 26 of the device 10 is a dual-inlet asymmetric turbocharger 26 as is well known in the art. The turbocharger 26 includes a compressor assembly 138, a turbine assembly 142, and a shaft 146 operably connecting the turbine assembly 142 with the compressor assembly 138.

The turbine assembly 142 of the turbocharger 26 includes a turbine housing 150 and a turbine wheel 154 positioned within and rotatable with respect to the turbine housing 150. The turbine wheel 154, in turn, is coupled to and supported by the shaft 146 such that the two elements rotate together as a unit.

The turbine housing 150 of the turbine assembly 142 defines a first volute or scroll 158$a$ configured to direct exhaust gasses toward the blades of the turbine wheel 154, and a second volute or scroll 158$b$ also configured to direct exhaust gasses toward the blades of the turbine wheel 154. The turbine housing 150 also includes a first inlet 162$a$ in fluid communication with the first volute 158$a$, and a second inlet 162$b$ in fluid communication with the second volute 158$b$. In the illustrated implementation, the first volute 158$a$ has a smaller or asymmetric cross-sectional shape than the second volute 158$b$ as is well known in the art for an asymmetric dual-inlet turbocharger.

The compressor assembly 138 of the turbocharger 26 includes a compressor housing 166 and a compressor wheel 170 positioned within and rotatable with respect to the compressor housing 166. The compressor wheel 170, in turn, is coupled to and supported by the shaft 146 such that the compressor wheel 170, the shaft 146, and the turbine wheel 154 rotate together as a unit.

During use, the turbine assembly 142 receives both exhaust gas flows 76$a$, 76$b$ from the exhaust manifold 18 of the engine 14 via the first and second inlets 162$a$, 162$b$. More specifically, the first inlet 162$a$ receives the first exhaust gas flow 76$a$ from the first outlet 78 of the exhaust manifold 18 (e.g., from the first set of cylinders 42$a$), while the second inlet 162$b$ receives the second exhaust gas flow 76$b$ from the second outlet 90 of the exhaust manifold 18 (e.g., from the second set of cylinders 42$b$). The exhaust gasses 76$a$, 76$b$, then flow into their respective volutes 158$a$, 158$b$, where the exhaust gasses 76$a$, 76$b$ pass over the blades of the turbine wheel 154 creating torque and causing the turbine wheel 154, the shaft 146, and the compressor wheel 170 to rotate. As the compressor wheel 170 rotates, the compressor wheel 170 draws ambient air into the compressor housing 166 through an inlet 174, compresses the air, and discharges the resulting compressed air into the inlet 46 of the intake manifold 22 (described above) where it is mixed with fuel and distributed to the individual cylinders 42a, 42b as is well known in the art. Although not shown, the compressed air exhausted by the compressor wheel 170 may also be directed through a cooler before entering the inlet 46 of the intake manifold 22.

While not shown, the turbocharger 26 may also include an internal or external waste gate as is well known in the art to permit at least a portion of the exhaust gasses to bypass the compressor assembly 138.

Illustrated in FIG. 1, the EGR circuit 30 is in fluid communication with the EGR port 98 of the first fluid passageway 66a and is configured to re-direct a portion of the first exhaust gas flow 76a back into the intake manifold 22 as is well known in the art. During use, the EGR circuit 30 relies on the pressure differential between the exhaust system (e.g., the gas pressure within the first passageway 66a) and the intake manifold 22 to drive the exhaust gasses 76a to the intake side of the engine 14. While not shown, the EGR circuit 30 of the device 10 may also include an EGR valve to restrict the flow of gasses into the EGR circuit 30 from the first fluid passageway 66a, an EGR cooler, and other elements as is well known in the art.

Illustrated in FIG. 1, the controller 134 of the device 10 includes a processor 208, a memory unit 212 in operable communication with the processor 208, and one or more sensors 216-232 sending and receiving signals from the processor 208. The processor 208 is also in operable communication with one or more elements of the device 10 such as, but not limited to, the actuation device 114 of the valve 102, the EGR valve 210, the turbocharger waste gate (not shown), the engine 14, and other control systems not discussed herein. During use, the controller 134 receives a continuous stream of signals from the one or more sensors 216-232 regarding the operational status of the device 10, enters that information into one or more control algorithms, and outputs a signal to the actuation device 114 to adjust the valve angle 104 of the valve 102.

The controller 134 includes a plurality of sensors 216-232 positioned throughout the device 10 to provide information regarding the operation of the engine 14, turbocharger 26, and EGR circuit 30. In particular, the controller 134 includes a first exhaust pressure sensor 216, a second exhaust pressure sensor 220, a turbo speed sensor 224, an EGR flow sensor 228, and a fuel flow sensor 232. The sensors 216-232 may be present individually, in plurality, or in combination.

In still other implementations, the sensors 216-232 may include a combination of physical sensors and/or virtual sensors. More specifically, the processor 208 may use algorithms and system models to calculate the desired data points in lieu of detecting the data directly with a physical sensor. For example, the processor 208 may include a single exhaust pressure sensor and rely on system models and algorithms to calculate the exhaust pressure in the alternative gas passageway where no sensor is present.

The first exhaust pressure sensor 216 includes a pressure sensor mounted to the exhaust manifold 18 and configured to output signals representative of the average gas pressure of the exhaust gasses positioned within the first fluid passageway 66a. Similarly, the second exhaust pressure sensor 220 includes a pressure sensor mounted to the exhaust manifold 18 and configured to output signals representative of the average gas pressure of the exhaust gasses positioned within the second fluid passageway 66b. In both instances, the pressure sensors 216, 220 include a pressure sensor mounted to a boss or other mounting point formed into the body 62 of the exhaust manifold 18 and in fluid communication with the corresponding passageway 66a, 66b.

While the processor 208 of the present invention uses pressure sensors 216, 220 to determine the pressure differential between the two fluid passageways 66a, 66b; in alternative implementations alternative pieces of information may be used to calculate the pressure differential such as the engine speed, throttle setting, operating temperature, and the like.

The turbo speed sensor 224 is configured to output signals representative of the rotational speed of the shaft 146 of the turbocharger 26. More specifically, the turbo speed sensor 224 may include a hall effect sensor, optical sensor, and the like mounted to one of the turbine assembly 142 and the compressor assembly 138 and having access to the shaft itself 146. In alternative implementations, the processor 208 may calculate the rotational speed of the shaft indirectly via gas flow rates and the like.

The EGR flow sensor 228 is configured to output signals representative of the flow rate of gas through the EGR circuit 30 during operation of the engine 14. In the illustrated implementation, the EGR flow sensor 228 includes a flow sensor coupled to and in fluid communication with the EGR circuit 30.

The fuel flow sensor 232 is configured to output signals representative of the overall fuel consumption of the engine 14. However, in alternative implementations, the fuel flow sensor 232 may be configured to detect the fuel flow into each individual cylinder or a subset of cylinders (not shown).

While the illustrated processor 208 is in operable communication with the above referenced sensors, it is to be understood that more or fewer sensors may exist such as, but not limited to, an engine speed sensor, an induction temperature sensor, an induction pressure sensor, an induction humidity sensor, an EGR temperature sensor, exhaust temperature sensors for each passageway, coolant temperature sensors, and the like.

During operation, each cylinder 42a, 42b of the internal combustion engine 14 produces and expels exhaust gasses into a respective one of the inlets 74a-c and 76a-c of the exhaust manifold 18. The exhaust gasses then collect within the two passageways 66a, 66b of the manifold 18 to produce two exhaust gas flows 76a, 76b. As described above, each flow 76a, 76b then passes through its respective outlet 78, 90, through its respective turbocharger inlet 162a, 162b, and into its respective volute 158a, 158b of the turbocharger 26. More specifically, the exhaust gasses produced in the first set of cylinders 42a are collected within the first passageway 66a, and flow into the first volute 158a via the first turbocharger inlet 162a (which is coupled to the first outlet 78 of the first passageway 66a). Similarly, the exhaust gasses produced by the second set of cylinders 42b are collected within the second passageway 66b, and flow into the second volute 158b via the second turbocharger inlet 162b (which is coupled to the second outlet 90 of the second passageway 66b). Furthermore, if sufficient pressure differential exists between the exhaust manifold 18 and the intake manifold 22 and the EGR valve 210 is open, a portion of the gasses in the first passageway 66a may also pass through the EGR port 98 and into the EGR circuit 30 to be recirculated through the engine 14 as is well known in the art.

As operation of the engine 14 continues, the asymmetric shapes of the two volutes 158a, 158b generate backpressure within the exhaust manifold 18 in the form of gas pressure within each of the two passageways 66a, 66b. Generally speaking, the smaller cross-sectional shape of the first volute 158a produces a larger gas pressure within the first passageway 66a for a given flow rate of gas than the larger, second volute 158*b* produces in the second passageway 66*b* for that same flow rate. The gas pressure within each of the two passageways 66*a*, 66*b* can be influenced by, among other things, the valve angle 104, the load and speed of the engine 14, the load and speed of the turbocharger 26, the configuration of the EGR valve 210, and the configuration of the waste gate valve (not shown). As such, the processor 208 is configured to adjust the above listed parameters to produce the desired operating conditions within the device 10.

In some implementations, the processor 208 is configured to optimize the pressure differential between the first and second fluid passageways 66*a*, 66*b*. To do so, the processor 208 first calculates the current pressure differential using the inputs from the first and second pressure sensors 216, 220. Once calculated, the processor then adjusts the valve angle 104 to alter the pressure differential until the desired value is produced. For example, if the pressure differential is too large, the processor 208 outputs a signal to the actuation device 114 to increase the valve angle 104 (e.g., move the valve 102 toward the fully open configuration; described above) to allow a greater flow rate of gas to pass between the two passageways 66*a*, 66*b*. In contrary, if the pressure differential calculated by the processor 208 is too small, the processor 208 outputs a signal to the actuation device 114 to decrease the valve angle 104 (e.g., to move the valve 102 toward the fully closed configuration; described above) restricting the flow of gas between the two passageways 66*a*, 66*b*.

In other implementations, the processor 208 is configured to optimize the rotational speed of the turbocharger 26. To do so, the processor 208 utilizes the inputs from the turbocharger speed sensor 224, and potentially the first and second pressure sensors 216, 220. More specifically, the processor 208 monitors the turbocharger speed as detected by the turbocharger speed sensor 224 and adjusts the valve angle 104 to produce the desired turbocharger speed. For example, if the turbocharger speed is too fast, the processor 208 outputs a signal to the actuation device 114 to increase the valve angle 104. This generally serves to reduce the gas pressure within the first passageway 66*a* by allowing gasses to flow into the second passageway 66*b* in fluid communication with larger, second volute 158*b*. The decrease in pressure, in turn, generally reduces the rotational speed of the turbocharger 26.

In contrast, if the turbocharger speed is too slow, the processor 208 outputs a signal to the actuation device 114 to decrease the valve angle 104. This generally serves to increase gas pressure within the first passageway 66*a* by restricting the bleed-off of gasses into the second passageway 66*b*. The increase in pressure, in turn, generally increases the rotational speed of the turbocharger 26.

In still other implementations, the processor 208 may also provide signals to the turbocharger waste gate (described above) to supplement any changes in the valve angle 104. For example, if the turbocharger 26 is rotating too quickly, the processor 208 may increase the valve angle 104 a lesser amount than would normally be necessary but supplement such an action by also partially opening the waste gate valve.

In still other implementations, the processor 208 is configured to optimize the rate of gas flow through the EGR circuit 30. To do so, the processor 208 utilizes inputs from the EGR flow sensor 228 and potentially the first and second pressure sensors 216, 220. More specifically, the processor 208 monitors the flow of gas through the EGR circuit 30 as detected by the EGR flow sensor 228 and adjusts the valve angle 104 to produce the desired flow rate through the EGR circuit 30. For example, if the EGR flow rate is too low, the processor 208 outputs a signal to the actuation device 114 to decrease the valve angle 104. This generally serves to increase the gas pressure within the first passageway 66*a* which is in direct fluid communication with the EGR port 98. As such, an increase in gas pressure within the first passageway 66*a* increases the pressure differential across the engine 14 (e.g., between the exhaust manifold 18 and the intake manifold 22) causing a larger volume of gas to flow through the EGR circuit 30.

In contrast, if the EGR flow rate is too high, the processor 208 outputs a signal to the actuation device 114 to increase the valve angle 104. This generally serves to decrease the gas pressure within the first passageway 66*a* and therefore decreases the pressure differential across the engine 14. As such, a lower volume of gas flows through the EGR circuit 30. Still further, the processor 208 may also provide signals to the EGR valve 210 to supplement any changes to the valve 102.

In still other implementations, the processor 208 is configured to improve engine transient response. To do so the processor 208 utilizes inputs from the fuel flow sensor 232. More specifically, the processor 208 is configured to reduce the valve angle 104 in response to a rapid increase in fuel flow to the engine 14, as detected by the fuel flow sensor 232. By closing the valve 102, the processor 208 allows pressure to build more rapidly within the turbocharger 26 (e.g., within the first volute 158*a*) permitting a more rapid increase in airflow into the engine 14 to correspond with the increase in fuel flow detected by the fuel flow sensor 232.

In addition to the operational parameters described above, the processor 208 may also be configured to optimize additional operating parameters of the device 10 such as, but not limited to, engine pressure differential (e.g., intake v. exhaust manifold pressure), pumping mean effective pressure, break specific fuel consumption, and the pressure acting on various exhaust system components. In still other implementations, the processor 208 may balance multiple parameters simultaneously to provide the most desirable operating conditions.

FIGS. 5-7 illustrate another implementation of the exhaust manifold 18'. The exhaust manifold 18' is substantially similar to the exhaust manifold 18 and therefore only the differences will be described in detail herein. The exhaust manifold 18' includes a body 62' at least partially defining a first passageway 66*a*' and a second passageway 66*b*'. During use, both passageways 66*a*', 66*b*' are configured to collect exhaust gasses from a subset of cylinders 42*a*, 42*b* of the engine 14 and direct the exhaust gasses into a respective one of the one or more inlets of the turbocharger 26.

The first fluid passageway 66*a*' of the exhaust manifold 18' includes a first set of one or more inlets 74*a*', 74*b*', 74*c*', each corresponding to and configured to receive exhaust gasses from a corresponding one of the first set of cylinders 42*a* of the engine 14 to produce a first exhaust gas flow 76*a*'. The first fluid passageway 66*a*' also includes a first outlet 78' in constant fluid communication with each of the one or more first inlets 74*a*', 74*b*', 74*c*' and is configured to direct the first exhaust gas flow 76*a*' contained within the first fluid passageway 66*a*' into a corresponding one of the inlets of the turbocharger 26 (described below).

The first fluid passageway 66*a*' also includes a first communication channel 194*a*'. The first communication channel 194*a*' includes an aperture in fluid communication with the passageway 66*a*' and formed into the sidewall thereof (see FIG. 6).

The second fluid passageway 66b' of the exhaust manifold 18' includes a second set of one or more inlets 86a', 86b', 86c', each corresponding to and configured to receive exhaust gasses from a corresponding one of the second set of cylinders 42b of the engine 14 to produce a second exhaust gas flow 76b'. The second fluid passageway 66b' also includes a second outlet 90' in constant fluid communication with each of the one or more second inlets 86a', 86b', 86c' and configured to direct the second exhaust gas flow 76b' contained within the second fluid passageway 66b' into a corresponding one of the inlets of the turbocharger 26 (described below).

The second fluid passageway 66b' also includes a second communication channel 194b'. The second communication channel 194b' includes an aperture in fluid communication with the passageway 66b' and formed into the sidewall thereof (see FIG. 6).

The body 62' of the exhaust manifold 18' also at least partially defines a secondary chamber 198'. The secondary chamber 198' is in fluid communication with both the first fluid passageway 66a' and the second fluid passageway 66b'. More specifically, the secondary chamber 198' is open to both the first communication channel 194a' and the second communication channel 194b. In the illustrated implementation, the secondary chamber 198' includes a removable cover (not shown) to completely enclose and pneumatically seal the secondary chamber 198' from the surrounding atmosphere.

The exhaust manifold 18' also includes a valve 102' at least partially positioned within the secondary chamber 198' and configured to selectively restrict the flow of exhaust gasses between the first passageway 66a' and the second passageway 66b'. More specifically, the valve 102' is continuously adjustable between a first, fully open configuration, in which the first fluid passageway 66a' is in fluid communication with the second fluid passageway 66b' via the secondary chamber 198'; and a second, closed configuration, in which the first fluid passageway 66a' is not in fluid communication with the second fluid passageway 66b'. During use, adjusting the valve 102' from the second configuration to the first configuration allows the exhaust gasses to flow between the first and second passageways 66a', 66b' at an increasingly larger volumetric flow rate. As such, the pressure differential or ΔP between the two passageways 66a', 66b' generally reduces the closer to the first configuration the valve 102' is positioned.

In the illustrated implementation, the valve 102' is a gate valve positioned within the secondary chamber 198' and configured to selectively close one of the first communication between channel 194a' and the second communication channel 194b'. More specifically, the valve 102' includes a valve body 202' movable with respect to the body 62' of the manifold 18', and an actuation device 114' configured to move the valve body 202' into and out of engagement with the respective communication channel 194a'. As shown in FIGS. 6 and 7, the valve body 202' is sized and shaped to engage and form a seal with the first communication channel 194a' when then the valve 102' is in the closed configuration. Alternatively a valve could be applied solely to communication channel 194b or valves may be applied to both communication channels 194a and 194b.

The invention claimed is:

1. An exhaust manifold for use with an internal combustion engine, the exhaust manifold comprising:
   a body;
   one or more fluid passageways defined by the body;
   a valve in fluid communication with at least one of the one or more fluid passageways, the valve being adjustable between an open configuration and a closed configuration;
   an actuator in operable communication with the valve and configured to adjust the valve between the open and closed configurations;
   a heat shield at least partially positioned between the actuator and the one or more fluid passageways; and
   wherein at least a portion of the head shield includes a fluid jacket.

2. The exhaust manifold of claim 1, wherein the heat shield at least partially defines a storage volume, and wherein the actuator is at least partially positioned within the storage volume.

3. The exhaust manifold of claim 1, wherein the actuator is coupled to the body.

4. The exhaust manifold of claim 1, wherein the body includes a mounting bracket, and wherein the actuator is coupled to the mounting bracket.

5. The exhaust manifold of claim 4, wherein the heat shield is mounted to the mounting bracket.

6. The exhaust manifold of claim 5, wherein the heat shield is mounted to the mounting bracket such that it can be removed from the mounting bracket without removing the actuator from the mounting bracket.

7. The exhaust manifold of claim 6, wherein the heat shield includes a plurality of walls, and wherein each wall includes a fluid jacket.

8. The exhaust manifold of claim 1, wherein the heat shield is formed from one of metallic and ceramic material.

9. An exhaust manifold for use with an internal combustion engine, the exhaust manifold comprising:
   a body;
   one or more fluid passageways defined by the body;
   a valve in fluid communication with at least one of the one or more fluid passageways, the valve being adjustable between an open configuration and a closed configuration;
   an actuator mounted to a bracket and in operable communication with the valve and configured to adjust the valve between the open and closed configurations; and
   a heat shield at least partially positioned between the actuator and the body, wherein the heat shield is mounted to the bracket, and wherein the heat shield is configured such that the heat shield can be detached from the bracket without having to first detach the actuator from the bracket.

10. The exhaust manifold of claim 9, wherein the heat shield at least partially defines a volume, and wherein the actuator is at least partially positioned within the volume.

11. The exhaust manifold of claim 10, wherein the actuator is completely positioned within the volume.

12. The exhaust manifold of claim 9, wherein the heat shield includes a fluid jacket.

13. The exhaust manifold of claim 12, wherein the heat shield includes a plurality of walls, wherein at least one wall is positioned between the actuator and the body, and wherein the at least one wall positioned between the actuator and the body includes a fluid jacket.

14. The exhaust manifold of claim 9, further comprising a thermo isolating spacer positioned between the actuator and the bracket.

15. The exhaust manifold of claim 9, wherein the bracket is integrally formed as one piece with the body.

16. The exhaust manifold of claim 9, wherein the bracket includes a first set of mounting points and a separate second set of mounting points, wherein the actuator is coupled to the first set of mounting points, and wherein the heat shield is coupled to the second set of mounting points.

17. An exhaust manifold for use with an internal combustion engine having a fluid cooling system, the exhaust manifold comprising:
- a body;
- one or more fluid passageways defined by the body;
- a valve in fluid communication with at least one of the one or more fluid passageways, the valve being adjustable between an open configuration and a closed configuration;
- an actuator in operable communication with the valve and configured to adjust the valve between the open and closed configurations; and
- a heat shield at least partially positioned between the actuator and the body, wherein the heat shield defines a fluid jacket.

18. The exhaust manifold of claim 17, wherein the fluid jacket is in fluid communication with the fluid cooling system of the internal combustion engine.

* * * * *